United States Patent
Kitamura et al.

(10) Patent No.: US 6,928,297 B2
(45) Date of Patent: Aug. 9, 2005

(54) PORTABLE TELEPHONE, DIFFUSER AND LIGHTING DEVICE PROVIDED THEREIN

(75) Inventors: Hiromu Kitamura, Tokyo (JP); Shuichi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 445 days.

(21) Appl. No.: 10/043,671

(22) Filed: Jan. 11, 2002

(65) Prior Publication Data

US 2002/0094790 A1 Jul. 18, 2002

(30) Foreign Application Priority Data

Jan. 12, 2001 (JP) ........................................ 2001-005274

(51) Int. Cl.$^7$ ................................................. H04M 1/00
(52) U.S. Cl. .................... 455/550.1; 455/90.3; 362/24; 362/88; 345/170; 200/310; 200/314
(58) Field of Search .............................. 200/313, 314, 200/317, 310; 345/170; 361/680; 362/88, 23, 24, 28, 29, 30, 326, 334, 355; 455/90.3, 575.1, 550.1; 379/368, 433.07

(56) References Cited

U.S. PATENT DOCUMENTS

| | | | |
|---|---|---|---|
| 4,349,705 A | 9/1982 | Kuhfus | 379/361 |
| 5,128,842 A | 7/1992 | Kenmochi | 362/95 |
| 5,408,060 A | 4/1995 | Muurinen | 200/314 |
| 5,512,718 A * | 4/1996 | Larose | 200/314 |
| 5,746,493 A | 5/1998 | Jonsson et al. | |
| 5,867,772 A | 2/1999 | Jonsson et al. | 455/575.1 |
| 5,975,711 A | 11/1999 | Parker et al. | 362/24 |
| 6,278,887 B1 * | 8/2001 | Son et al. | 455/566 |
| 6,550,927 B1 | 4/2003 | Messel | 362/24 |

FOREIGN PATENT DOCUMENTS

| | | |
|---|---|---|
| CN | 1217120 A | 5/1999 |
| EP | 84 36 320.7 | 5/1986 |

OTHER PUBLICATIONS

*Equivalent to WO 97/33417.

* cited by examiner

*Primary Examiner*—Vivian Chin
*Assistant Examiner*—Lewis West
(74) *Attorney, Agent, or Firm*—Scully, Scott, Murphy & Presser (57) ABSTRACT

In a portable telephone including a plurality of input buttons 1 for inputting various indications, light emitting elements 7 which emit a light, when any one of the input buttons 1 is pushed on, diffusers 8 which are located under a plurality of input buttons 1 and which diffuse the light emitted from the light emitting element 7, the diffuser 8 has an incidence portion 5 which has a receiving plane positioned near the light emitting elements 7 and receiving the light emitted from the light emitting elements 7, and a projecting portion 6 which has a reflecting plane for reflecting the light received by the incidence portion 5 to an upper side of a plurality of input buttons 1.

8 Claims, 8 Drawing Sheets

PORTABLE TELEPHONE, DIFFUSER AND LIGHTING DEVICE PROVIDED THEREIN

BACKGROUND OF THE INVENTION

The present invention relates to a portable telephone, a diffuser and a lighting device both of which are provided in the portable telephone, in particular to the portable telephone having a back light, and the like which uniformly emit a light on input buttons, the diffuser and the lighting device both of which are provided in the portable telephone.

In a conventional portable telephone, a light emitting element, such as a light emitting diode (hereunder called LED), and the like is provided, for example, near input buttons, such as numeral keys, or the like. The light emitting element is adjusted to emit a light every time that any one of the input buttons are pushed on by an user. Accordingly, the conventional portable telephone can be used by the user even in the darkness.

The conventional portable telephone comprises a housing, a plurality of input buttons, a substrate, and a plurality of LEDs each of which is mounted on the substrate and located under a part of the housing between the input buttons. The input buttons are consisting mainly of resins, respectively. Each of the resins includes a diffuser including a diffusing material on which a light from the LED is incident and through which the light is emitted towards an upper side of the input buttons. A surface of the resin defines a lighting surface which transmits or reflects the light from the LED. The conventional portable telephone can be used even in the darkness by driving the LED, when any one of the input buttons are pushed on by an user.

However, a strength of a light projected from the resin actually becomes smaller as the light becomes remote from the LED. This is not only because the transmission light is fewer than the transmission light at the lighting plane but also because the progressing light is not adjusted to transmit the lighting plane. The strength of the light projected from the resin becomes smaller as the light becomes remote from the LED. As a result, literatures depicted in the input buttons sometimes cannot be seen sufficiently, when the conventional portable telephone is in the darkness. Some proposals are made for solving this problem. For example, numbers of the LEDs are increased. Further, a strength of emitting light in the LED is increased. Moreover, a distance between the LED and the lighting plane is designed to be longer.

However, in a case that the numbers of the LEDs are increased or that the strength of emitting light in the LED is increased, power consumption of the conventional portable telephone is also increased. Further, in a case that the distance between the LED and the lighting plane is designed to be longer, thickness of the conventional portable telephone sometimes becomes larger.

SUMMARY OF THE INVENTION

It is therefore an object of the present invention to provide a compact portable telephone which is capable of preventing a strength of a light projected from a diffuser positioned remote from LED from becoming smaller, without increasing power consumption of the portable telephone.

Other objects of the present invention will become clear as the description proceeds.

According to an aspect of the present invention, there is provided a portable telephone comprising: a plurality of input buttons for inputting various indications; at least one light emitting element which emits a light, when any one of a plurality of input buttons is pushed on; at least one diffuser which is located under a plurality of input buttons and which diffuses the light emitted from the light emitting element; the diffuser including: an incidence portion which has a receiving plane positioned near the light emitting element and receiving the light emitted from the light emitting element; and a projecting portion which has a reflecting plane for reflecting the light received by the incidence portion to an upper side of a plurality of input buttons.

The receiving plane of the incidence portion may be a part of an arc any portions of which has an equal distance from the light emitting element.

Concave and convex may be formed on a surface of the receiving plane of the incidence portion.

The light emitting element may be a light emitting diode.

According to another aspect of the present invention, there is also provided a diffuser located under the input buttons of the portable telephone, wherein the diffuser comprises: an incidence portion which has a receiving plane for receiving a light emitted from the light emitting element; and a projecting portion which has a reflecting plane for reflecting the light received by the incidence portion to an upper side of a plurality of input buttons.

According to yet another aspect of the present invention, there is also provided a lighting device located near the input buttons of the portable telephone, wherein the lighting device further comprises: at least one light emitting element which emits a light, when any one of a plurality of input buttons is pushed on; at least one diffuser which diffuses the light emitted from the light emitting element; the diffuser further comprising: an incidence portion which has a receiving plane for receiving a light emitted from the light emitting element; and a projecting portion which has a reflecting plane for reflecting the light received by the incidence portion to an upper side of a plurality of input buttons.

DETAILED DESCRIPTION OF THE PREFERRED EMBODIMENTS

Figure 1:
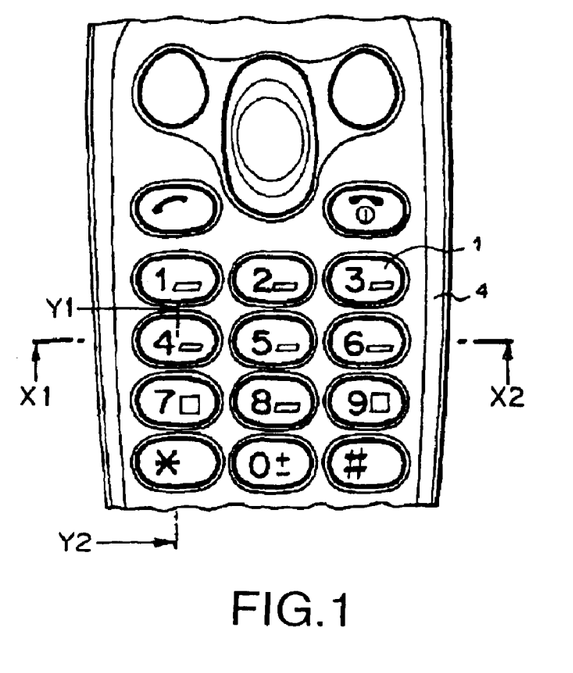
FIG. 1 is a schematic view for partially showing a conventional portable telephone around the input buttons thereof.
Figure 2:
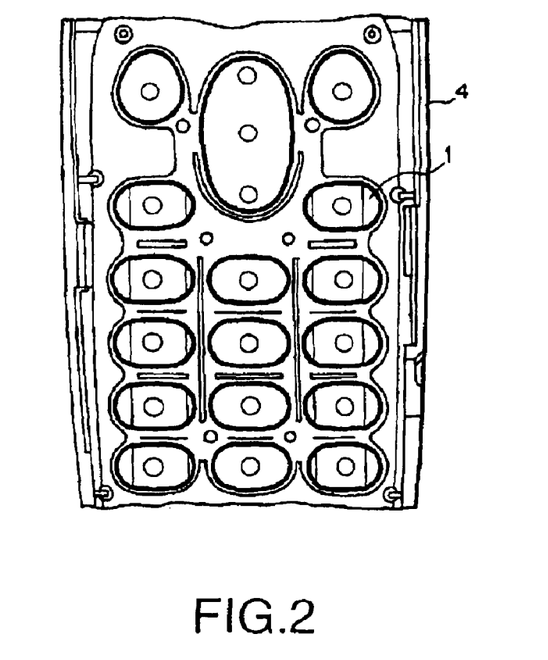
FIG. 2 is a schematic view for partially showing a back surface of a housing of the conventional portable telephone around the input buttons thereof.

Referring to FIGS. 1 through 6, description is, at first, made about a conventional portable telephone in order to facilitate an understanding of the present invention. FIG. 1 is a schematic view for partially showing a conventional portable telephone around the input buttons thereof. FIG. 2 is a schematic view for partially showing a back surface of a housing of the conventional portable telephone around the input buttons thereof. As illustrated in FIGS. 1 and 2, the conventional portable telephone comprises a housing 4 and a plurality of input buttons 1, such as numeral keys, or the like.

Figure 3:
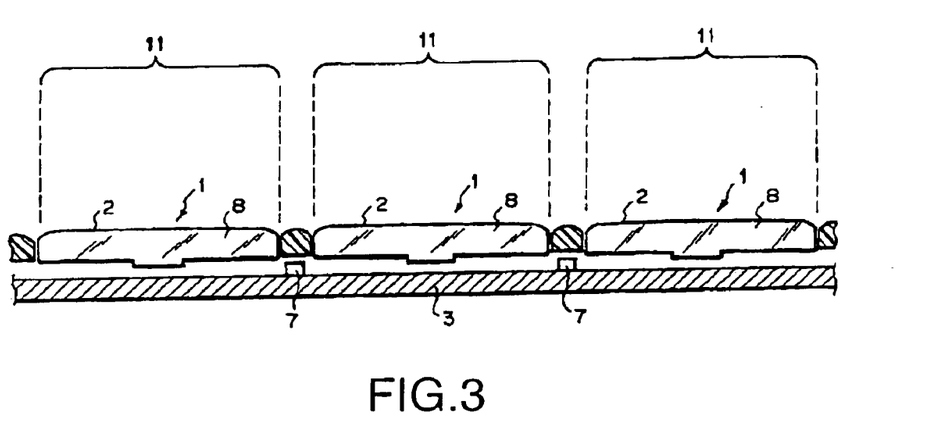
FIG. 3 is a sectional view of the housing of the conventional portable telephone around the input buttons thereof seen from the line X1 to X2 of FIG. 1.
Figure 4:
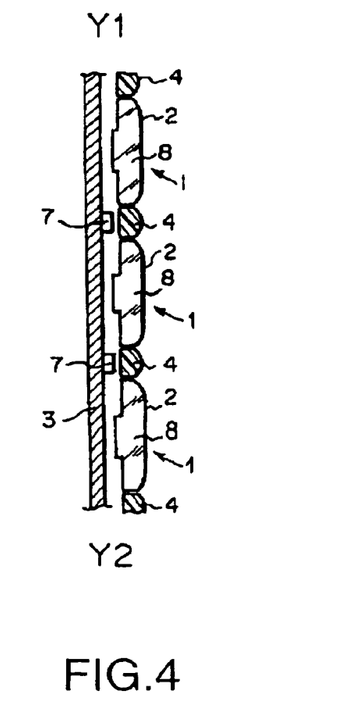
FIG. 4 is a sectional view of the housing of the conventional portable telephone around the input buttons thereof seen from the line Y1 to Y2 of FIG. 1.

FIG. 3 is a sectional view of the housing of the conventional portable telephone around the input buttons thereof seen from the line X1 to X2 of FIG. 1. FIG. 4 is a sectional view of the housing of the conventional portable telephone around the input buttons thereof seen from the line Y1 to Y2 of FIG. 1. Besides, as illustrated in FIGS. 3 and 4, the conventional portable telephone further comprises LEDs 7 which are located under a part of the housing 4 between the input buttons 1. In addition, the input buttons 1 are consisting mainly of resins 8, respectively. Each of the resins 8 includes a diffuser material on which a light from the LED 7 is incident and through which the light is emitted towards an upper side of the input buttons 1. A surface of the resin 8 defines an illumination plane 2 which transmits or reflects the light from the LED 7. Further, the LED 7 is mounted on a substrate 3.

Figure 5:
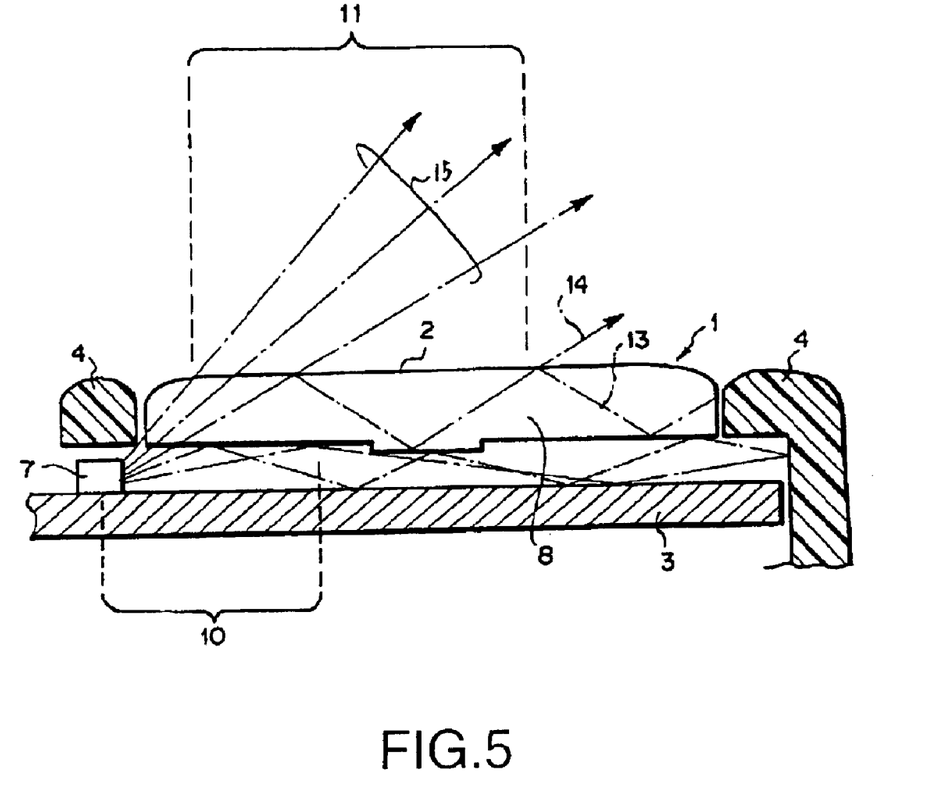
FIG. 5 is an enlarged view for showing one of the input buttons 1 illustrated in FIG. 3, which is located on the right side thereof.

FIG. 5 is an enlarged view for showing one of the input buttons 1 illustrated in FIG. 3, which is located on the right side thereof. Although a light from the LED 7 is illustrated in FIG. 5, refraction of the light is not illustrated therein for convenience of an explanation. In FIG. 5, illustrated is a transmission light 15 at an illumination plane 2, a transmission light 14 reflected at once on the illumination plane 2 and thereafter transmitting through the illumination plane 2, a progressing light 13 progressing within a resin 8, a direct projection plane 10 in which the light from the LED 7 directly reaches the illumination plane 2, a projection plane 11 of the transmission light 14 and the transmission light 15, respectively.

As described above, in the conventional portable telephone, a plurality of LEDs 7 are located between the input buttons 1. The conventional portable telephone can be used even in the darkness by driving the LED 7, when any one of the input buttons 1 are pushed on by an user.

Figure 6:
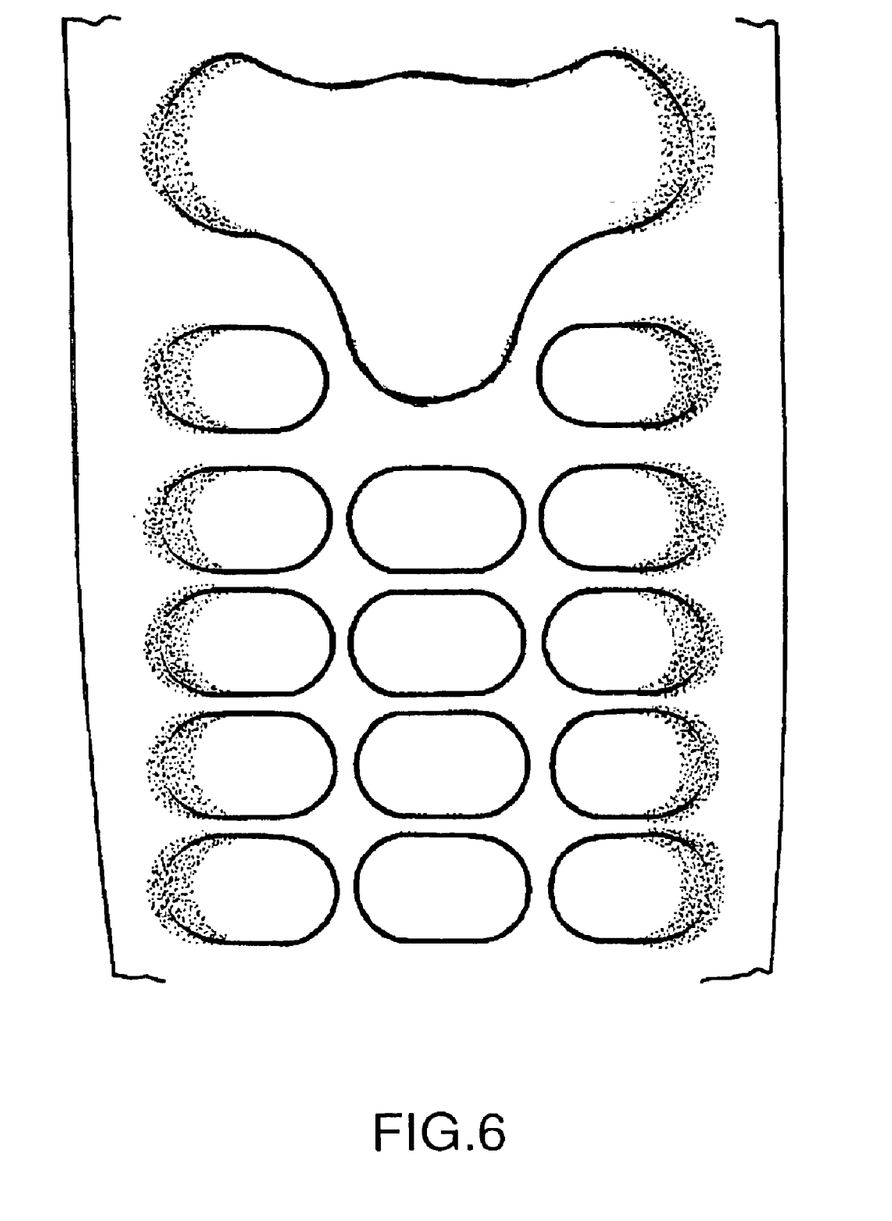
FIG. 6 is a luminance distribution diagram of the light from the LED 7 in the conventional portable telephone.

However, the conventional portable telephone has the following problems. FIG. 6 is a luminance distribution diagram of the light from the LED 7 in the conventional portable telephone. A diffuser of the conventional portable telephone includes a diffusing material. However, as illustrated in FIG. 6, a strength of a light projected from the resin 8 actually becomes smaller as the light becomes remote from the LED 7. This is, as illustrated in FIG. 5, not only because the transmission light 14 is fewer than the transmission light 15 at the illumination plane 2 but also because the progressing light 13 is not adjusted to transmit the illumination plane 2.

As mentioned above, the strength of the light projected from the resin 8 becomes smaller as the light becomes remote from the LED 7. As a result, literatures depicted in the input buttons 1 sometimes cannot be seen sufficiently, when the conventional portable telephone is in the darkness. Some proposals are made for solving this problem. For example, numbers of the LEDs 7 are increased. Further, a strength of emitting light in the LED 7 is increased. Moreover, a distance between the LED 7 and the illumination plane 2 is designed to be longer.

However, in a case that the numbers of the LEDs 7 are increased or that the strength of emitting light in the LED 7 is increased, power consumption of the conventional portable telephone is also increased. Further, in a case that the distance between the LED 7 and the illumination plane 2 is designed to be longer, thickness of the conventional portable telephone sometimes becomes larger.

Now, referring to FIGS. 7 through 14 with reference to FIGS. 1 and 2 continued, description will proceed to a portable telephone according to a preferred embodiment of the present invention.

The portable telephone according to the preferred embodiment of the present invention has a structure similar to that of the conventional one illustrated in FIGS. 1 and 2.

Figure 7:
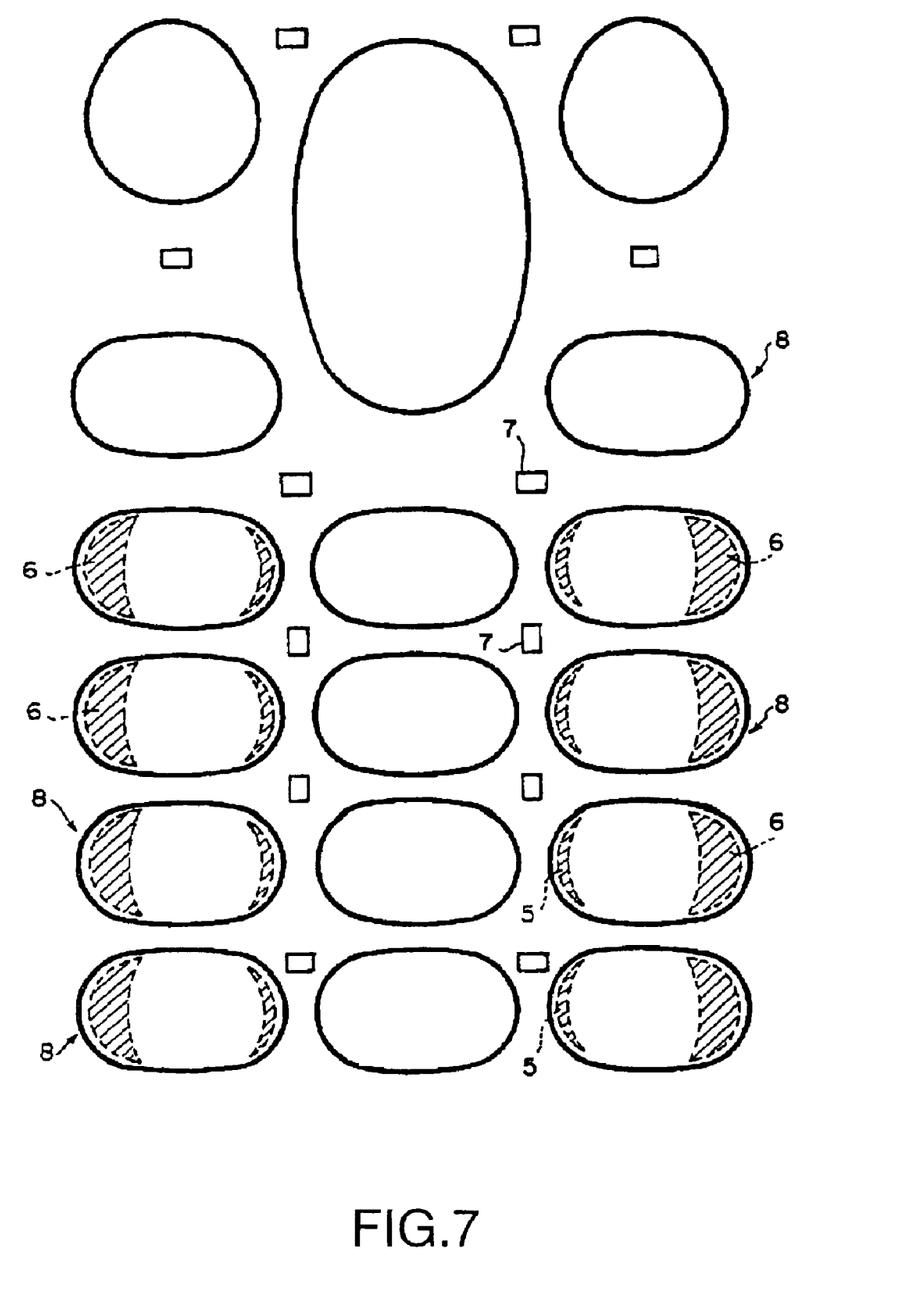
FIG. 7 is a schematic view for showing the portable telephone according to the preferred embodiment in which the housing 4 of FIG. 1 is removed.

As illustrated in FIGS. 1 and 2, the portable telephone according to the preferred embodiment of the present invention comprises the input buttons 1, such as numeral keys, or the like. FIG. 7 is a schematic view for showing the portable telephone according to the preferred embodiment in which the housing 4 of FIG. 1 is removed. In FIG. 7, illustrated are LEDs 7 which are located under a part of the housing 4 between the input buttons 1. In addition, each of the input buttons 1 includes resin 8, such as acrylic resin, polycarbonate resin, or the like, respectively. Each resin 8 is consisting of a diffuser having an incidence portion 5 and a projecting portion 6. The incidence portion 5 receives an incident light from the LED 7 while the projecting portion 6 projects the incident light towards an upper side of the input button 1.

Besides, it is alternative that the diffusing material is not included in the resin 8. Accordingly, variation of design, such as specifications, color tone, or the like can be increased.

Figure 8:
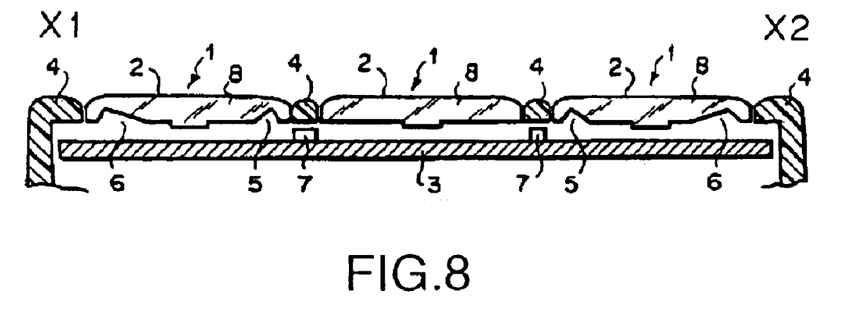
FIG. 8 is a sectional view of the housing of the portable telephone according to the preferred embodiment of the present invention around the input buttons 1 seen from the line X1 to X2 of FIG. 1.
Figure 9:
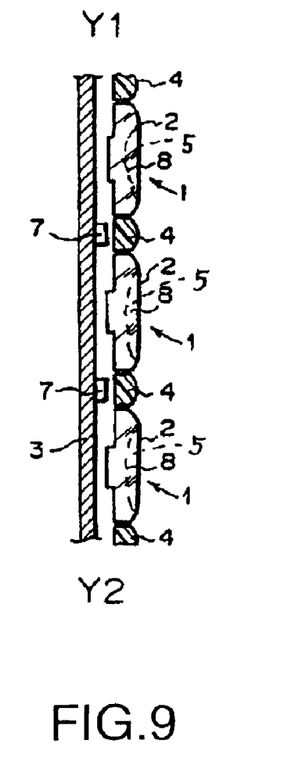
FIG. 9 is a sectional view of the housing of the portable telephone according to the preferred embodiment of the present invention around the input buttons 1 seen from the line Y1 to Y2 of FIG. 1.

FIG. 8 is a sectional view of the housing of the portable telephone according to the preferred embodiment of the present invention around the input buttons 1 seen from the line X1 to X2 of FIG. 1. FIG. 9 is a sectional view of the housing of the portable telephone according to the preferred embodiment of the present invention around the input buttons 1 seen from the line Y1 to Y2 of FIG. 1. Besides, as illustrated in FIGS. 8 and 9, a surface of the resin 8 is an illumination plane 2 through which a light from the LED 7 is transmitted or on which the light from the LED 7 is reflected. Further, the LEDs 7 are mounted on a substrate 3.

Figure 10:
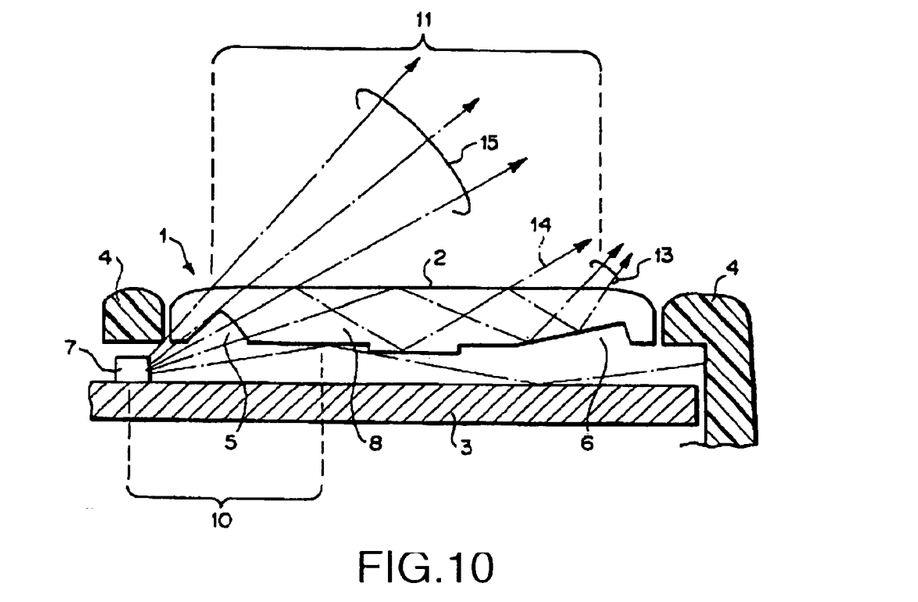
FIG. 10 is an enlarged view for showing one of the input buttons 1 illustrated in FIG. 8, which is located on the right side thereof.

FIG. 10 is an enlarged view for showing one of the input buttons 1 illustrated in FIG. 8, which is located on the right side thereof. Although a light from the LED 7 is illustrated in FIG. 10, refraction of the light is not illustrated therein for convenience of an explanation. In FIG. 10, illustrated is a transmission light 15 at an illumination plane 2, a transmission light 14 reflected at once on the illumination plane 2 and thereafter transmitting through the illumination plane 2, a progressing light 13 which is progressing within the resin 8 with reflection or diffusion and which transmits through the illumination plane 2 at the projecting portion 6, a direct projection plane 10 in which the light from the LED 7 directly reaches the illumination plane 2, a projection plane 11 of the transmission light 14 and the transmission light 15, respectively.

Herein, for example, in a case that the resin 8 is consisting of polycarbonate resin, that a distance in a horizontal direction between a center of the LED 7 and a center of the incidence portion 5 is from 1.0 mm to 3.0 mm, and that a distance between an upper surface of the LED 7 and a lower surface of the housing 4 above the LED 7 is from 0.5 mm to 1.5 mm, luminance of the transmission light 15 transmitting through the direct projection plane 10 comes to a desirable strength on a predetermined condition in spite of suppressing light emitting strength of the LED 7. The predetermined condition is not only that a plane of the incidence portion 5 at the side of the LED 7 has an angle between 15° and 20° against a horizontal plane but also that a plane of the incidence portion 5 at the opposite side has an angle between 35° and 45° against the horizontal plane. Further, in the case that the resin 8 is consisting of polycarbonate resin, that a distance in a horizontal direction between a center of the LED 7 and a center of the incidence portion 5 is from 1.0 mm to 3.0 mm, and that a distance between an upper surface of the LED 7 and a lower surface of the housing 4 above the LED 7 is from 0.5 mm to 1.5 mm, luminance of the progressing light 13 is not reduced on a predetermined condition despite that the progressing light 13 is transmitting through the resin 8 at a position remote from the LED 7. The predetermined condition is not only that a plane of the projecting portion 6 at the side of the LED 7 has an angle between 10° and 15° against a horizontal plane but also that a plane of the projecting portion 6 at the opposite side has an angle between 15° and 25° against the horizontal plane.

Next, description proceeds to a path of light in the resin 8. At first, the incidence portion 5 is formed. The light from the LED 7 is therefore not readily reflected when the light is illuminated on the resin 8. As a result, the light from the LED 7 is efficiently gathered into the resin 8. An incident angle into the illumination plane 2 is comparatively small in the light at a side near the LED 7 among the light gathered into the resin 8. Consequently, the light at the side near the LED 7 is directly projected as the transmission light 15 from the illumination plane 2 to the outside thereof. On the contrary, an incident angle into the illumination plane 2 of the resin 8 is comparatively large in the light at a side remote from the LED 7 among the light gathered into the resin 8. Consequently, a part or all of the light at the side remote from the LED 7 is reflected on the illumination plane 2 to progress within the resin 8 as the progressing light 13.

A part of the progressing light 13 transmits the illumination plane 2 to be projected to the outside of the resin 8 as the transmission light 14. However, the greater part of the progressing light 13 progress within the resin 8 as the progressing light 13 to be projected, as the transmission light, by the projecting portion 6 from the illumination plane 2 to the outside of the resin 8. Accordingly, a projecting plane 11 becomes large, as illustrated in FIG. 10.

Figure 11:
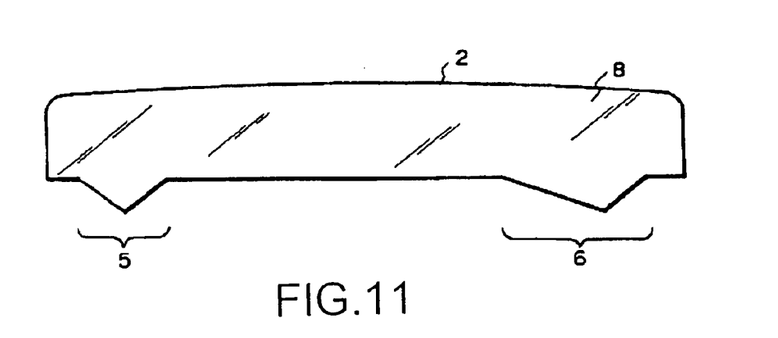
FIG. 11 is a view for showing another example of the resin of the portable telephone according to the preferred embodiment of the present invention.

In FIG. 10, the incidence portion 5 and the projecting portion 6 are formed by providing concave portions in the resin 8. However, the incidence portion 5 and the projecting portion 6 may be formed by providing convex portions in the resin 8, as illustrated in FIG. 11.

Figure 12:
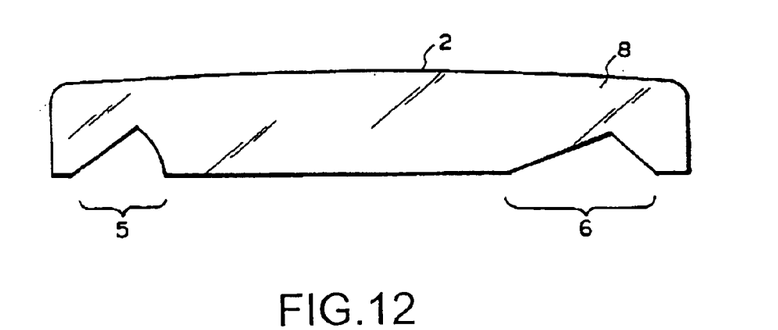
FIG. 12 is a view for showing another example of the resin of the portable telephone according to the preferred embodiment of the present invention.

Further, in FIG. 10, an incident plane of the incidence portion 5 into which the light from the LED 7 enters are formed to be a plane. Alternatively, the incident plane may be formed to be a part of an arc any portions of which has an equal distance from the LED 7 in order that the light from the LED 7 may be entered into the resin 8 more efficiently. An example of such a structure is illustrated in FIG. 12. In the structure being illustrated, the incident plane is formed to be a part of a spherical plane.

Figure 13:
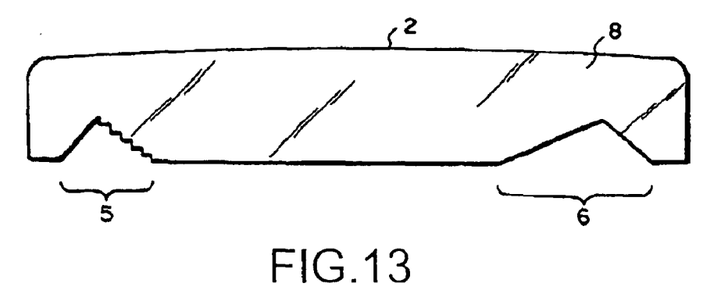
FIG. 13 is a view for showing another example of the resin of the portable telephone according to the preferred embodiment of the present invention.

Moreover, as illustrated in FIG. 13, minute concave and convex may be formed in the incident plane of the incidence portion 5 into which the light from the LED 7 enters by roughing a surface thereof. In this case, the light from the LED 7 is divided by the minute concave and convex. As a result, luminance of the progressing light 13 can be further prevented from being reduced despite that the progressing light 13 is transmitting through the resin 8 at a position remote from the LED 7.

Figure 14:
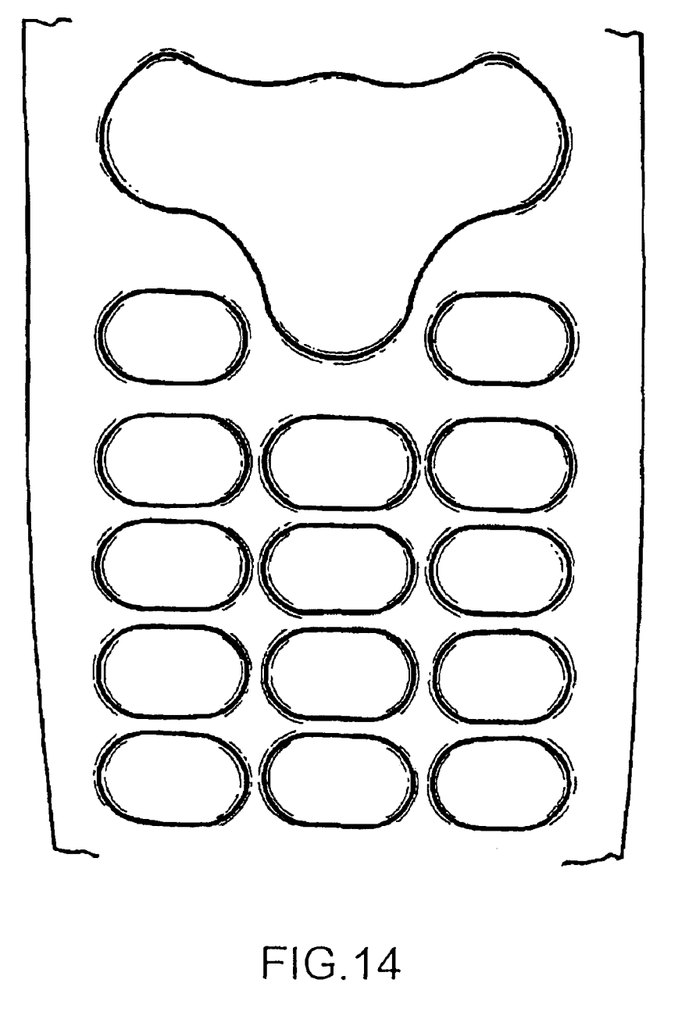
FIG. 14 is a luminance distribution diagram of the light from the LED 7 in the portable telephone according to the preferred embodiment of the present invention.

FIG. 14 is a luminance distribution diagram of the light from the LED 7 in the portable telephone according to the preferred embodiment of the present invention. As illustrated in FIG. 14, luminance of a light projected from the resin 8 becomes substantially uniform in spite of a distance from the LED 7 in the portable telephone according to the preferred embodiment of the present invention. Namely, the luminance of the light projected from the resin 8 becomes substantially uniform, even though the light becomes remote from the LED 7.

As described above, the portable telephone according to the preferred embodiment of the present invention comprises a diffuser in which the incidence portion 5 and the projecting portion 6 are formed. The strength of a light projected from the diffuser positioned remote from the LED 7 can be prevented from becoming smaller, even if numbers of the LEDs 7 are not increased, a strength of emitting light in the LED 7 is not increased, a distance between the LED 7 and the illumination plane 2 is not designed to be longer.

What is claimed is:

1. A portable telephone comprising a plurality of input buttons for inputting various indications;

at least one light emitting element which emits a light, when any one of said a plurality of input buttons is pushed on; said light emitting located under said a plurality of input buttons any one of said plurality of buttons being a diffuser to diffuse said light emitted from said light emitting element;

said diffuser including:

an incidence portion which has a receiving plane positioned near said light emitting element and receiving said light emitted from said light emitting element; and a projecting portion which has a reflecting plane for reflecting said light received by said incidence portion to an upper side of said a plurality of input buttons;

an illumination plane that transmits or reflects the light from the light emitting element:

a first transmission light directed onto the center of the incidence portion and transmitted through the illumination plane; and a second transmission light reflected once on the illumination plane and thereafter transmitting through the illumination plane; and a progressing light which progresses within said buttons by reflection or diffusion and transmits through said illumination plane at the projecting portion.

2. A portable telephone as claimed in claim 1, wherein said receiving plane of said incidence portion is a part of an arc any portions of which has an equal distance from said light emitting element.

3. A portable telephone as claimed in claim 1, wherein concave and convex are formed on a surface of said receiving plane of said incidence portion.

4. A portable telephone as claimed in claim 2, wherein concave and convex are formed on a surface of said receiving plane of said incidence portion.

5. A portable telephone as claimed in claim 1, wherein said light emitting element is a light emitting diode.

6. A portable telephone as claimed in claim 2, wherein said light emitting element is a light emitting diode.

7. A portable telephone as claimed in claim 3, wherein said light emitting element is a light emitting diode.

8. A portable telephone as claimed in claim 4, wherein said light emitting element is a light emitting diode.

* * * * *